United States Patent [19]

Raghunathan et al.

[11] 4,300,195
[45] Nov. 10, 1981

[54] CMOS MICROPROCESSOR ARCHITECTURE

[75] Inventors: Kuppuswamy Raghunathan; Philip S. Smith, both of Austin, Tex.

[73] Assignee: Motorola, Inc., Schaumburg, Ill.

[21] Appl. No.: 65,294

[22] Filed: Aug. 9, 1979

[51] Int. Cl.³ .............................................. G06F 9/06
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,003,028 | 1/1977 | Bennett et al. | 364/200 |
| 4,003,033 | 1/1977 | O'Keefe et al. | 364/200 |
| 4,021,656 | 5/1977 | Caudel et al. | 235/156 |
| 4,050,058 | 9/1977 | R. Garlic | 364/200 |

*Primary Examiner*—Gareth D. Shaw
*Assistant Examiner*—David Y. Eng
*Attorney, Agent, or Firm*—Anthony J. Sarli, Jr.; Vincent Ingrassia; Jeffrey Van Myers

[57] ABSTRACT

A CMOS microprocessor is provided having a plurality of registers wherein the registers contain RAM type storage cells resulting in compact, fully static registers. In most cases the registers are connected to two buses. A 5 bit temporary register and an 8 bit program counter are each connected to three buses. An incrementer can provide an increment or decrement function but cannot be used to store functions. A bit code generator is connected to a data bus thereby allowing any one selected data bit carried by the data bus to be modified. A 5 bit high order program counter is capable of directly transferring its contents to the 5 bit temporary register. An 8 bit low order incrementer is capable of incrementing three different registers which are an address storage register, a program counter, and a stack pointer. A 5 bit high order incrementer is also capable of incrementing three registers which are an address storage register, a program counter, and a temporary register. An ALU has a first and a second input, which because of the bus structure used, can both receive data simultaneously.

9 Claims, 4 Drawing Figures

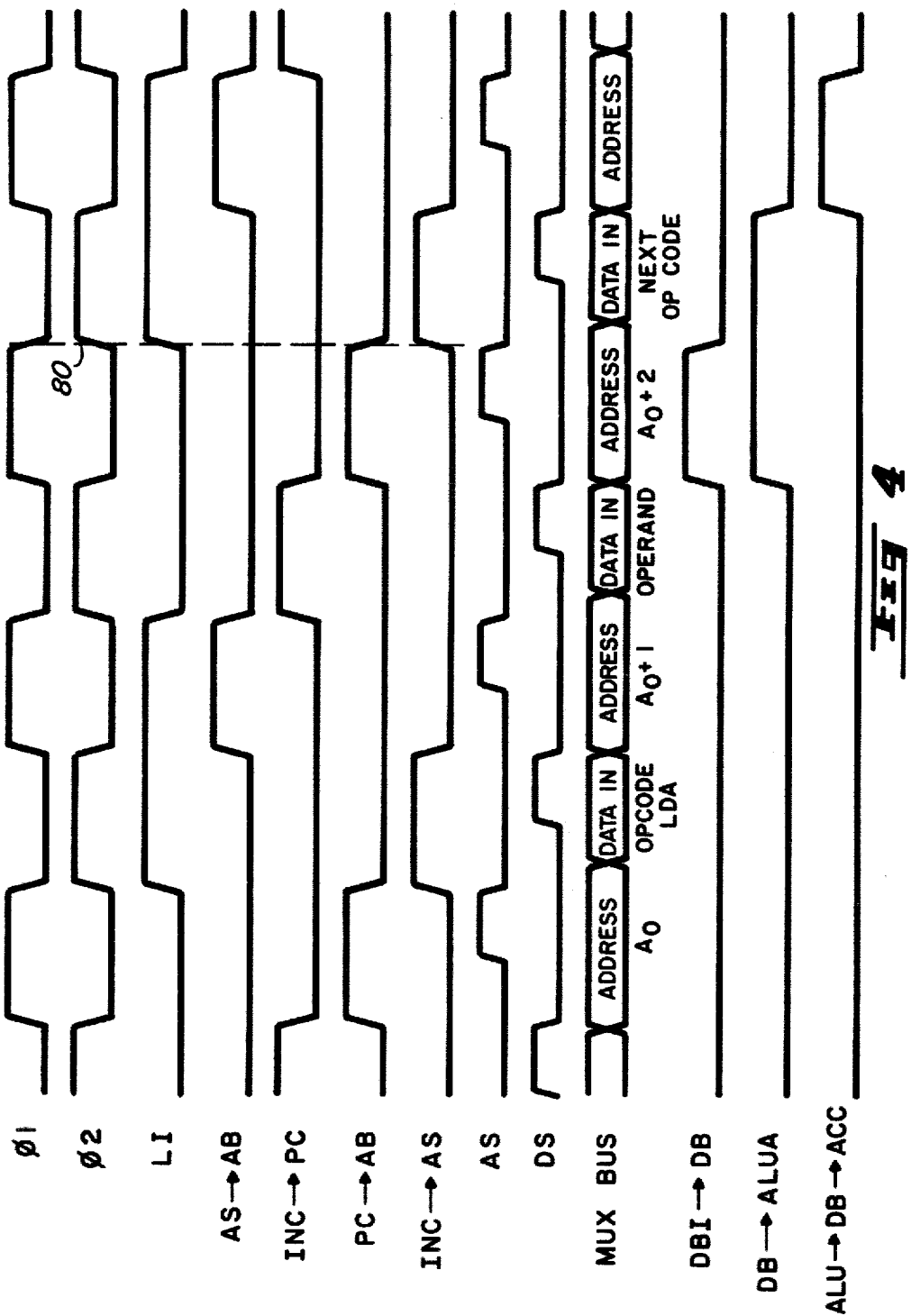

CMOS MICROPROCESSOR ARCHITECTURE

This invention relates, in general, to microprocessors, and more particularly, to an architecture for a CMOS microprocessor.

CROSS REFERENCE TO RELATED APPLICATIONS (1) U.S. patent application Ser. No. 065,292 filed of even data herewith entitled "Method For Reducing Power Consumed by a Static Microprocessor" and assigned to the assignee of the present invention.

(2) U.S. patent application Ser. No. 065,293 filed of even date herewith entitled "Apparatus For Reducing Power Consumed by a Static Microprocessor" and assigned to the assignee of the present invention.

BACKGROUND

The microprocessor has been catapulted into one of the most significant developments in the electronics field over the last decade. One of the reasons for this fast growth is the fact that technological advances into large scale integration have made the microprocessor the most effective, most reliable, simpliest, and least expensive way of accomplishing complex electronic functions today. It is not surprising, therefore, that the microprocessor, or in a larger sense, the microcomputer is dominating the technological development thinking for most equipment currently in the planning stages. The microcomputer is such a powerful performer that the vast majority of all possible applications probably could be served by any one of the dozens of different models available. Yet, for each application there probably is one microcomputer system which serves that purpose best. Despite occasional claims to the contrary, there is no such thing as a truly universal circuit, especially, not from the standpoint of cost-effectiveness. While one microcomputer system may come close to serving the bulk of all potential applications, it is likely that it will be over qualified for some, and under qualified for others. An over qualified system of course is not very cost effective. A microprocessor having CMOS transistors achieves the lowest possible power consumption.

Accordingly, it is an object of the present invention to provide a low cost, low power microprocessor having CMOS transistors and yet being capable of operating at speeds comparable to NMOS microprocessors.

Another object of the present invention is to provide a CMOS microprocessor having a common incrementer for a plurality of registers and using dual port storage cells in the registers which results in a reduction of chip area.

SUMMARY OF THE INVENTION

In carrying out the above and other objects of the invention in one form thereof, there is provided a CMOS microprocessor having an arithmetic logic unit (ALU) having a first and a second input. A data bus is provided for coupling registers of the microprocessor to the first input of the ALU, a transfer bus is provided for coupling to the second input of the ALU, and address buses are provided for coupling addresses out of the microprocessor. The microprocessor also has an incrementer which is capable of incrementing a plurality of registers. An internal data bus is also provided for coupling data from the data bus to the input/output ports of the microprocessor. The internal data bus is a static bus. A condition code register is coupled to the internal data bus and receives an input from the ALU. An accumulator and an index register are coupled between the first and second inputs of the ALU. An incrementer high, which increments high order bits, is coupled to an address bus high, to an address store high, to a program counter high, and to a temporary register high. An incrementer low, which increments the low order bits, is coupled to an address bus low, to an address store low, to a program counter low, and to a stack pointer. The registers have dual access RAM cells which in most cases are connected to two buses. Some of the register cells are connected to three buses which enhances the operating speed and efficiency of the microprocessor. The arrangement of the buses allows simultaneous transfers to the first and second inputs of the ALU.

BRIEF DESCRIPTION OF THE DRAWINGS

FIG. 4 shows some timing relationships helpful in better understanding the operation of the invention.

DETAILED DESCRIPTION OF THE PREFERRED EMBODIMENT

Figure 1:
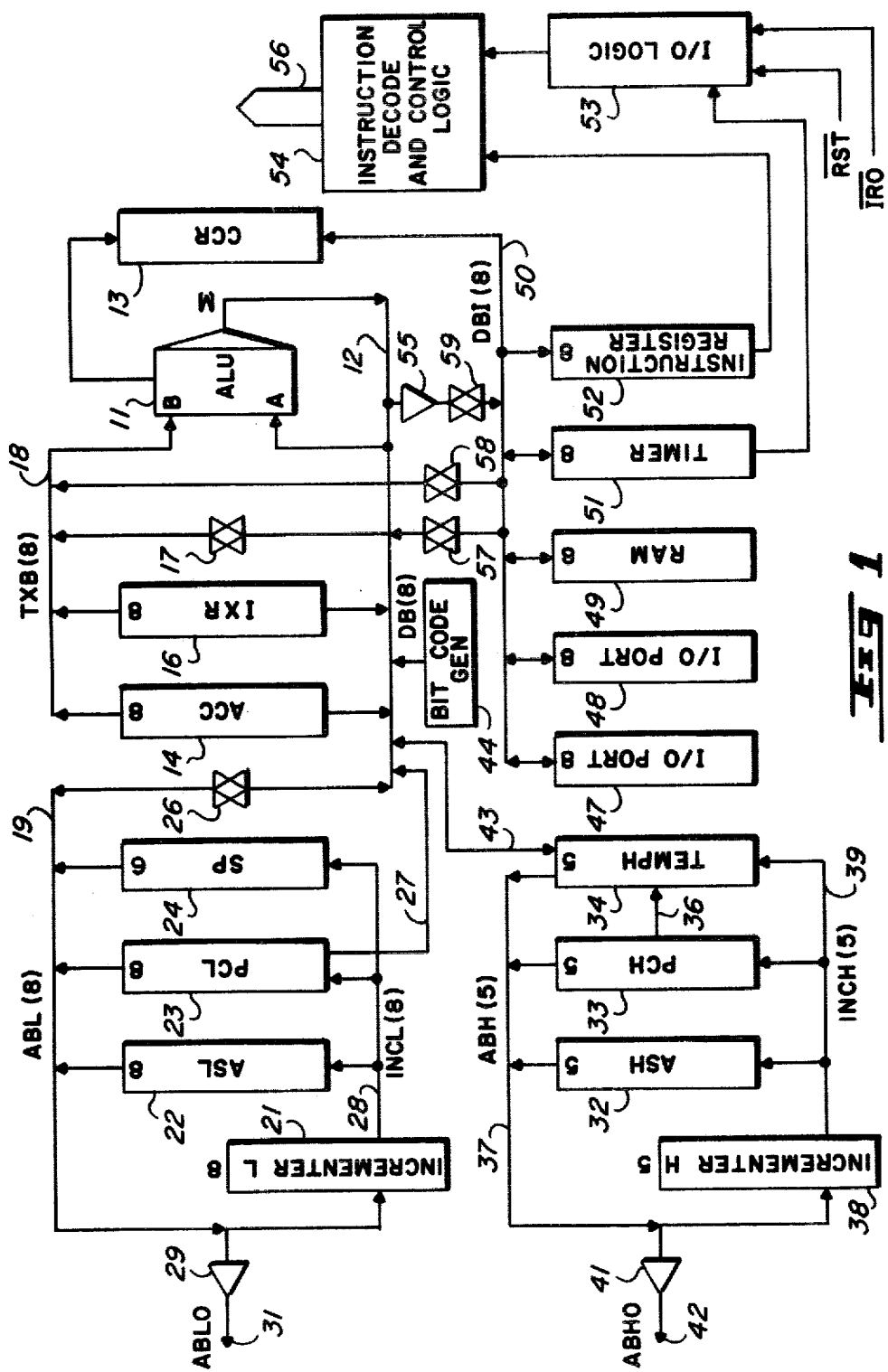
FIG. 1 illustrates, in block diagram form, the present invention in one form thereof.

Referring first to FIG. 1, there is illustrated an 8 bit fully static microprocessor containing RAM, timer, and input/output (I/O). The microprocessor has an ALU 11 having an input A, and input B, and a summation output. The summation output is coupled to an 8 bit data bus 12. Data bus 12 couples information to input A. Information is carried to input B by an 8 bit transfer bus 18. An accumulator 14 is coupled to both transfer bus 18 and data bus 12. Accumulator 14 is an 8 bit general purpose register used for arithmetic calculations and data manipulations. An 8 bit index register 16 is coupled between transfer bus 18 and data bus 12. Index register 16 is used during an index mode of addressing and provides an 8 bit address which may be added as an offset to create a new effective address. Index register 16 is also used for calculations and data manipulation during read/modify/write instructions, and as a temporary storage register when not in use for addressing purposes. A transmission gate 17 is used to couple data bus 12 to transfer bus 18. A condition code register 13 is coupled to internal data bus 50 and receives an input from ALU 11. Condition code register 13 is a 5 bit register and contains flags which reflects the results of ALU 11 operations. A first bit contained in condition code register 13 is a carry bit and is set when a carry or a borrow out of ALU 11 occurs during an arithmetic operation. The carry bit can also be modified by certain branch instructions. A second bit in condition code register 13 is a zero bit and is set whenever the result of the last arithmetic, logical, or data manipulation is zero. A third bit is a negative bit which indicates that the result of the last arithmetic, logical, or data manipulation is negative. A fourth bit is a mask interrupt bit and when set, disables both external and timer interrupts. Clearing the interrupt mask bit enables both of the interrupts. Both the timer and external interrupts are latched so that no interrupts are lost because of the interrupt mask bit being set. A fifth bit is a half carry bit, and is set if a carry occurs between bits 3 and 4 of the ALU during an add or an add with carry instruction.

An 8 bit address bus 19 is coupled to data bus 12 by transmission gate 26. Address bus 19 carries the lower 8 bits of an address. The microprocessor of FIG. 1 is capable of addressing up to 8 K bytes of external memory with a multiplexed address/data bus. Address bus 19 is coupled to an output buffer 29 and to an incrementer 21. Buffer 29 provides buffered outputs on line 31 which is the 8 bit lower order output address bus. Incrementer 21 is an 8 bit incrementer which can decrement as well as increment. Incrementer 21 is coupled to three registers by line 28. The three registers are an address store register 22, a program counter register 23, and a stack pointer 24. Address store 22 is an 8 bit register which is used to store a lower order effective address such as generated from a branch instruction. Program counter 23 is an 8 bit register which contains the lower 8 bits of a thirteen bit word which is used to point to the next instruction to be executed by the microprocessor. Stack pointer 24 is a 6 bit stack pointer which contains the address of the next free location on a push down/pop up stack. The stack pointer decrements during pushs and increments during pulls. Stack pointer 24 is used to store the location of the return address on subroutine calls and to store the location of the machine state during interrupts. In a preferred embodiment stack pointer 24 is an 8 bit register with the two most significant bits permanently set to a predetermined state.

The outputs of registers 22, 23, and 24 are connected to address bus 19. Program counter 23 also provides an output to data bus 12 via line 27. When one of register 22, 23, or 24 is desired to be modified its contents are transferred by address bus 19 to incrementer 21, where incrementer 21 can increment or decrement the contents, and the contents are then carried by line 28 back to any desired register. This arrangement of incrementer 21 with registers 22, 23 and 24 permit one common incrementer/decrementer for three registers with one of the registers, the program counter, also being directly coupled to data bus 12. As mentioned hereinbefore, address bus 19 is coupled to data bus 12 by transmission gate 26.

It should be noted that although the buses are illustrated by one line, they are multiple lines with each different line carrying a different data bit.

The higher five bits of the address word are provided on line 42 by output buffer 41. Output buffer 41 is coupled to a 5 bit address bus 37. It should be noted that in a preferred embodiment, the lower eight bits of the address are multiplexed to external devices while the upper five bits are directly provided on interface pins. Address bus 37 is also coupled to an incrementer/decrementer 38 which is similar to incrementer 21 but only handles five bits. An address store register 32 is coupled between the output of incrementer 38 to address bus 37. Address store 32 contains the high bits of the address while address store 22 contains the lower eight bits of the address. A 5 bit program counter 33 is coupled between the output of incrementer 38 and address bus 37. A 5 bit temporary register 34 is coupled from the output of incrementer 38 to address bus 37. Program counter 33 also provides an output 36 to temporary register 34, which allows the contents of program counter 33 to be directly transferred into temporary register 34. This transfer between registers of course results in faster operation. The output of incrementer 38 is carried by a 5 bit bus or line 39 to registers 32, 33, and 34. Temporary register 34 is directly coupled to data bus 12 by interconnect bus 43. A bit code generator 44 is also connected to data bus 12 which allows any one of the bit lines of data bus 12 to be set or reset under instruction control.

An 8 bit internal data bus 50 is coupled by transmission gate 57 to data bus 12, by a transmission gate 58 to transfer bus 18, and receives information from data bus 12 by buffer/driver 55 and transmission gate 59. Buffer/driver 55 and transmission gate 59 are connected in series. As will be seen hereinafter, the registers are compact, fully static, and are not required to provide static current drive since the drive is provided by buffer 55. By having buffers/drivers 29, 41, and 55 the registers do not require large current drivers and therefore the entire microprocessor can be made smaller in size. An 8 bit I/O port 47 and an 8 bit I/O port 48 are coupled to internal data bus 50. I/O ports 47 and 48 contain data direction registers which control whether the individual interface pins associated with the I/O ports are serving as an input or an output for the microprocessor. Also coupled to internal data bus 50 is a random access memory (RAM) 49 which stores 8 bit words. In a preferred embodiment, RAM 49 stores 112 bytes. RAM 49 could be used for, among other things, a stack to store the contents of the registers during an interrupt.

Timer 51 is coupled to internal data bus 50 and has a single 8 bit counter with a 7 bit prescaler as its timer. The 8 bit counter is preset under program control and then decrements towards zero. When a zero crossing is detected the timer interrupt request bit of timer 51 is set, then, if a timer interrupt mask and the interrupt mask bit of condition code register 13 are both cleared the microprocessor receives an interrupt. The microprocessor now stores the appropriate registers on the stack, which is located in RAM 49, and then fetches the interrupt address vectors and begins servicing the interrupt. The prescaler of timer 51 is a 7 bit counter used to extend the maximum length of the timer. Timer 51 also provides an output to input/output logic 53. Input/output logic 53 provides an output to instruction decode and control logic 54. Input/output logic 53 receives and processes a reset and an interrupt request input. An 8 bit instruction register 52 is coupled from internal data bus 50 to instruction decode and control logic 54. Control logic 54 provides decoded instruction outputs and the necessary controls on output lines 56. The outputs on line 56 are used throughout the microprocessor to control the functioning and operation of the microprocessor, a few of such being transmission gates 17, 57, 58, and 59 and bit code generator 44. It is possible for the microprocessor to be a microcomputer simply by the addition of a read only memory (ROM) coupled to internal data bus 50.

Figure 2:
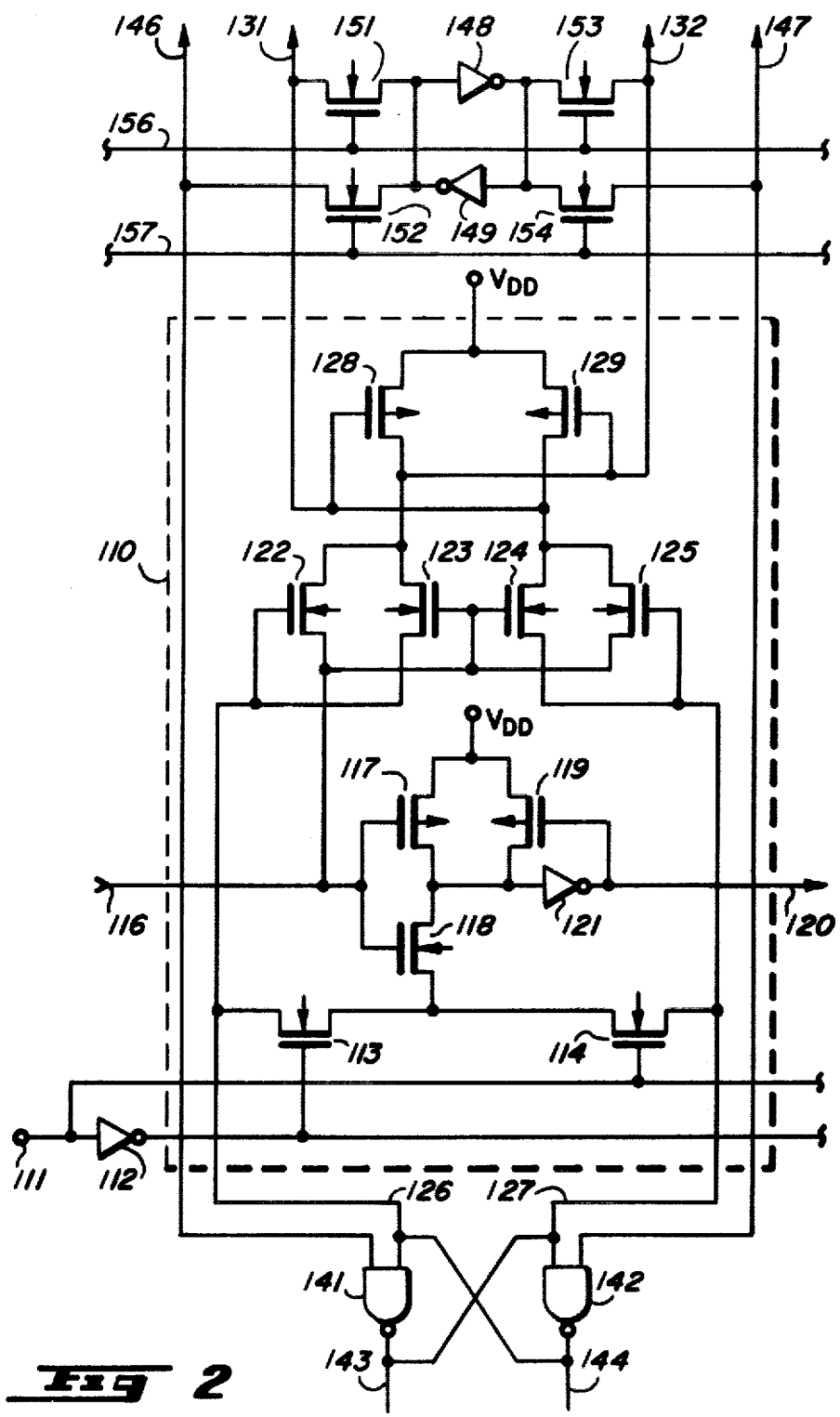
FIG. 2 shows a portion of the incrementer register capable of incrementing one bit.

Referring now to FIG. 2, there is illustrated a one bit portion of an incrementer/decrementer circuit such as will be found in incrementer 21 and incrementer 38. Also shown in an output bus latch and a cell typical of the cells used in the registers. An incrementer/decrementer circuit 110 receives a control signal at input 111. The control signal is an increment/decrement command which controls N channel transistors 113 and 114. The increment/decrement command is coupled from input 111 to a gate electrode of transistor 114, and is inverted by inverter 112 and coupled to a gate electrode of transistor 113. Transistors 113 and 114 serve as controllable means for coupling inputs from inputs 126 and 127, respectively, to a source electrode of N channel transistor 118. N channel transistor 118 has its gate electrode connected to a gate electrode of a P channel transistor 117. The gate electrodes of transistors 117 and 118 are coupled to an input 116 which is a carry input. Transistors 117 and 118 are connected in series between a voltage terminal $V_{DD}$ and a node formed between transistors 113 and 114. A node which is formed between transistors 117 and 118 is coupled to an input of inverter 121. Inverter 121 provides an output on output line 120 which is a carry/borrow output. The output of inverter 121 is also connected to a gate electrode of a P channel transistor 119. P channel transistor 119 is coupled from voltage terminal $V_{DD}$ to the input of inverter 121 and forms a feedback means around inverter 121. Transistor 119 is only made conductive when the output of inverter 121 is a logic level low. A logic level low on the gate electrode of transistor 119 causes transistor 119 to conduct and maintain a logic level high at the input of inverter 121 thereby latching inverter 121 in a state to produce a logic level low output. Transistors 117, 118, 119, and 121 form a carry/borrow generator having controllable means 113 and 114 for coupling data bits or their complements from lines 126 and 127.

A P channel transistor 128 is connected in series with an N channel transistor 123 between voltage terminal $V_{DD}$ and data input line 126. An output node is formed between transistors 123 and 128 and is connected to increment/decrement output 132. An N channel transistor 122 is coupled between output 132 and carry input 116. Transistor 122 has its gate electrode coupled to data input 126. A P channel transistor 129 is coupled in series with an N channel transistor 124 between voltage terminal $V_{DD}$ and data input 127. An output node is formed between transistors 124 and 129 and is coupled to increment/decrement output 131. An N channel transistor 125 is coupled between output 131 and carry input 116. Transistor 125 has its gate electrode coupled to input 127. In a preferred embodiment, transistors 128 and 129 are P channel transistors, however, it will be noted that other suitable load devices could be substituted for transistors 128 and 129.

Data input 127 is a complement of data input 126. Increment/decrement outputs 131 and 132 are also complements of each other. Increment/decrement output 131 will be a logic level high when both inputs 116 and 127 are logic levels low or logic levels high. When output 131 is a logic level high then output 132 will be a logic level low. Increment/decrement output 132 will be a logic level high when both inputs 116 and 126 are both logic level lows or are both logic level highs. Circuit 110 is an incrementer when increment/decrement input 111 is held at a logic level high and is a decrementer when input 111 is held at a logic level low.

The circuits 110 would be interconnected so that the carry input 116 of one would receive the carry output 120 of the preceding circuit. The outputs 131 and 132 would each go to a respective storage cell of registers which are to be incremented or decremented. Examples of such registers are address storage register 22, 32, program counter register 23, 33, and stack pointer 24 (all of FIG. 1).

Output 131 is shown coupled to a pair of inverters 148 and 149 by an N channel transistor 151. Inverters 148 and 149 form a latch or storage location of a typical static register. Transistor 151 has its gate electrode connected to line 156 which could carry a control signal such as an address store load command. Inverters 148 and 149 are also coupled to a bus 146 by an N channel transistor 152. Bus 146 could be an address bus within the microprocessor. Transistor 152 has its gate electrode connected to a line 157 which would carry a control signal such as a bus load command. Output 132 is coupled to inverters 148 and 149 by an N channel transistor 153 which has its gate electrode connected to control line 156. Inverters 148 and 149 are also coupled to a bus 147 by an N channel transistor 154 which is controlled by a control signal on line 157. It should be noted that buses 146 and 147 will carry complementary signals. Transistors 152 and 154 are enabled by the same command signal carried on line 157 and will accordingly couple the register true and its complement output to buses 146 and 147. The true and its complement are stored in the latch formed by inverters 148 and 149. Buses 146 and 147 are coupled to an output latch formed by a cross coupled pair of NAND gates 141 and 142. The output latch formed by logic gates 141 and 142 couples buses 146 and 147 to buses 143 and 144 which would represent the lower order output bus and its complement of line 31 shown in FIG. 1. This arrangement will cause buses 143 and 144 to be static buses. NAND gate 141 has a first input connected to bus 146 and a second input connected to the output from NAND gate 142, which is bus 144. Line 126 is also connected to output bus 144, and as discussed hereinbefore, line 126 serves as an input for increment/decrement circuit 110. NAND gate 141 has its first input connected to bus 147 and its second input connected to the output of NAND gate 141 which is also output bus 143. Line 127 is also connected to output bus 143.

Figure 3:
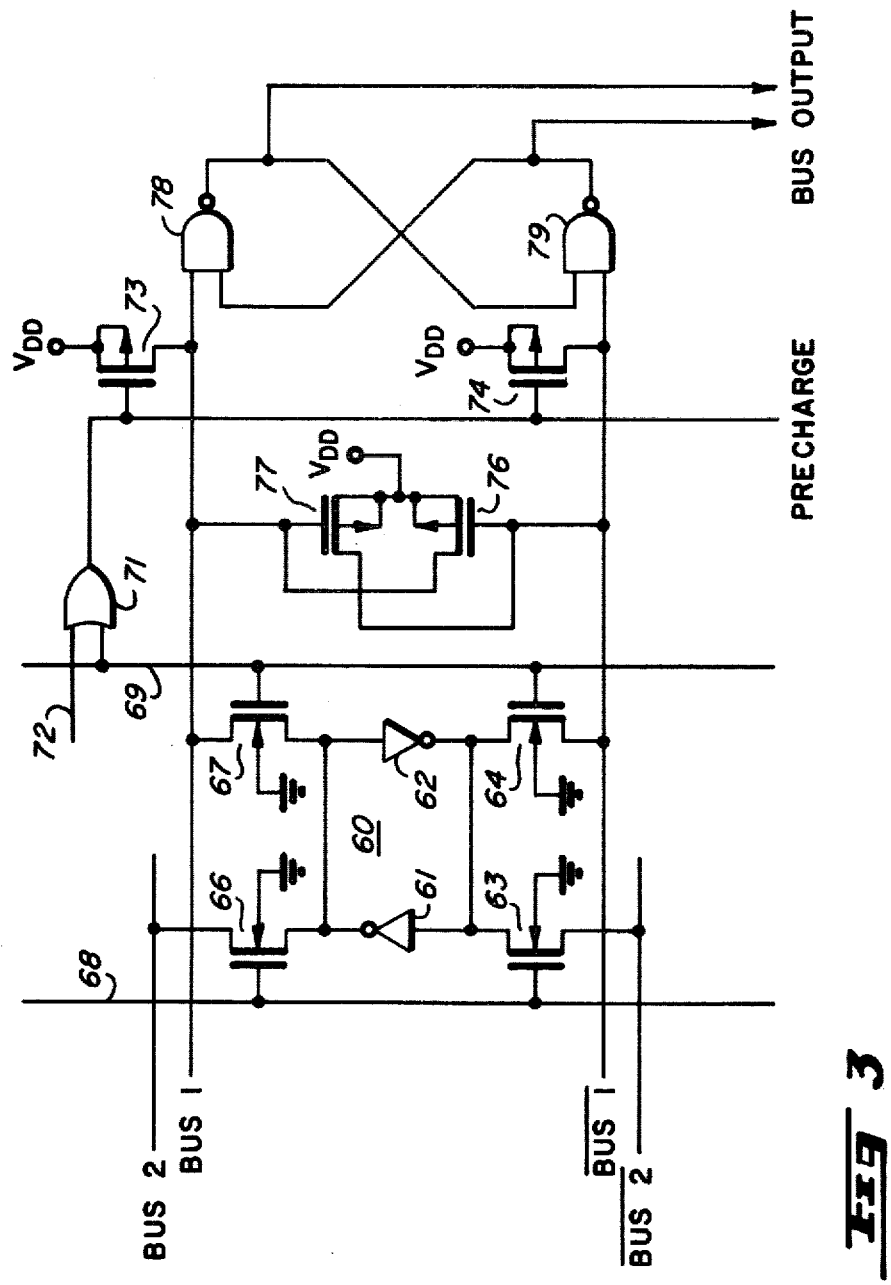
FIG. 3 illustrates in schematic and logic block form the interconnection scheme of one of the register cells with the buses.

FIG. 3 illustrates a storage cell for a single bit of one of the registers and its associated buses along with the precharge scheme used. The storage cell of the registers are dual access RAM cells and are connected to two buses in most of the cases. A transfer control signal on line 68 loads register cell 60 with the contents of BUS 2. Normally BUS 2 obtains its data from a drive large enough to overwrite the previous contents of register cell 60. When a transfer control signal is present on line 69, the contents of register cell 60 is transferred to BUS 1 which serves as an output bus. Register cell 60 has inverters 61 and 62. It should be noted by now that the bus structure of the microprocessor is such that the bus lines carry the true and well as complement data. When line 68 carries an enabling signal, N channel transistors 63 and 66 are enabled thereby allowing data from BUS 2 into cell 60 and the complement data from $\overline{BUS\ 2}$ to be coupled in by transistor 63 to the input of inverter 61. When a transfer control signal is present on line 69, N channel transistors 64 and 67 are enabled thereby allowing output data from inverter 61 to be coupled by transistor 67 to BUS 1 and complement data out of inverter 62 to be coupled by transistor 64 to $\overline{BUS\ 1}$. Line 69 is also connected to an input of OR gate 71. A second input for OR gate 71 is connected to line 72 which carries a control input so that the output of OR gate 71 can enable P channel precharge transistors 73 and 74. Transistor 73 has its gate electrode connected to the precharge output of OR gate 71, its source electrode connected to voltage terminal $V_{DD}$, and its drain electrode connected to BUS 1. Transistor 74 has its gate electrode connected to the precharge output of OR gate 71, its source electrode connected to voltage terminal $V_{DD}$, and its drain electrode connected to $\overline{BUS\ 1}$. On one portion of the clock cycle, BUS 1 and $\overline{BUS\ 1}$ will be precharged, and on another portion transfer control signal will enable transistors 64 and 67 so that data can be transferred to BUS 1 and $\overline{\text{BUS 1}}$. The cycle then repeats itself.

A pair of NAND gates 78 and 79 are interconnected to form a latch. Any information transferred to the address or data buses will be latched. The output of NAND gate 78 is connected to one of the inputs of NAND gate 79 and the output of NAND gate 79 is connected to one of the inputs of NAND gate 78. A second input of gate 78 is connected to BUS 1 while a second input of gate 79 is connected to $\overline{\text{BUS 1}}$. NAND gates 78 and 79 form an output latch which provides a true and its complement output for an output bus. Also connected between the second inputs of gates 78 and 79 are two P channel transistors 76 and 77. Transistor 77 has its gate electrode connected to the second input of gate 78, has a first electrode connected to voltage terminal $V_{DD}$, and has a second electrode connected to the second input of gate 79. Transistor 76 has its gate electrode connected to the second input of gate 79, has a first electrode connected to voltage terminal $V_{DD}$, and has a second electrode connected to the second input of gate 78. The purpose of transistor 77 is to place a full voltage amplitude logic "1" level on the second input of gate 79 when the second input to gate 78 is a logic level "0". Gate 76 provides a full voltage amplitude logic level "1" to the second input of gate 78 when the second input to gate 79 is a logic level "0".

FIG. 4 is a timing diagram showing some timing relationships that could be helpful in better understanding the operation of the microprocessor. The top two waveforms, $\phi 1$ and $\phi 2$, are processor clock signals. Next are the timing waveforms useful in following a Load Accumulator from Memory instruction, LDA. Signal LI represents the time to load instruction register 52. Address registers 22 and 32, program counters 23 and 33, and incrementer 21 and 38 are used in LDA. Register to bus transfers occur on $\phi 1$, e.g., ASL→ABL, ASH →ABH and PCL→ABL, PCH→ABH. The incrementers transfer back to the registers during $\phi 2$. The waveform labeled AS→AB represents timing for address storage registers 22 and 32 transfers to address buses 19 and 37 respectively. The INC→PC waveform represents timing for incrementers 21 and 38 transfer to program counters 23 and 33 respectively. The PC→AB waveform represents timing for program counters 23 and 33 transfers to address buses 19 and 37 respectively. The INC→AS waveform represents timing for incrementers 21 and 38 transfers to address storage registers 22 and 32 respectively.

The AS waveform is the address strobe, DS waveform is the data strobe, and MUX BUS is the multiplexed bus which alternates between carrying the effective address and input data. The multiplexed bus would be coupled to internal data bus 50. Waveforms DBI→DB and, DB→ALUA are some of the signals required in transferring data from internal data bus (DBI) 50 to accumulator 14. First, operand data goes to data bus (DB) from the internal data bus (DBI), then to the A input of ALU 11 to be ANDed with highs on input B, and back to accumulator 14 on the following $\phi 1$ pulse. Note that this overlaps the loading of the next instruction and reduces the cycle length, which is possible because data bus 12 is not used for instruction loading, decoding or address transferring. Dotted line 80 indicates the beginning of the next instruction.

By now it should be appreciated that there has been provided a new and improved microprocessor structure which permits transfers between registers such as from program counter 33 to temporary register 34, and from an incrementer to at least three other registers. Data transfers are also permitted from an internal data bus 50 to a transfer bus 18. Transfers from program counter 23 directly to data bus 12 are also possible. The layout of the registers, their cells, and buffer drivers result in a compact, fully static microprocessor. Since the buses are static, the lower order 8 bit temporary register has been eliminated. The arrangement of the buffer/driver easily permits more registers to be added since compact registers are used. The incrementers can easily handle additional registers.

We claim:

1. A CMOS microprocessor comprising:
 a data bus;
 a transfer bus;
 an arithmetic logic unit having a first input coupled to the data bus, a second input coupled to the transfer bus, and an output coupled to the data bus;
 an index register having inputs and outputs coupled to the data bus and to the transfer bus;
 an accumulator register having inputs and outputs coupled to the data bus and to the transfer bus;
 a first address bus;
 first switching means for selectively coupling the first address bus to the data bus;
 a first incrementer bus;
 a first incrementer having an input coupled to the first address bus, and an output coupled to the first incrementer bus;
 a stack pointer register having an input coupled to the first incrementer bus, and an output coupled to the first address bus;
 a first program counter register having an input coupled to the first incrementer bus, a first output coupled to the first address bus, and a second output coupled to the data bus;
 a first address store register having an input coupled to the first incrementer bus, and an output coupled to the first address bus;
 a second address bus;
 a second incrementer bus;
 a second incrementer having an input coupled to the second address bus, and an output coupled to the second incrementer bus;
 a second address store register having an input coupled to the second incrementer bus, and an output coupled to the second address bus;
 a second program counter register having an input coupled to the second incrementer bus, and an output coupled to the second address bus;
 a temporary storage register having inputs coupled to the second incrementer, to the second program counter, and to the data bus, and outputs coupled to the second address bus and to the data bus;
 an internal data bus;
 a condition code register having inputs coupled to the arithmetic logic unit and to the internal data bus, and an output coupled to the internal data bus;
 second switching means for selectively coupling the internal data bus to the data bus;
 input/output means for selectively coupling the internal data bus to devices external to the microprocessor;

an instruction register having an input coupled to the internal data bus, and an output;

instruction decode and control means coupled to the output of the instruction register, for controlling the operation of the arithmetic logic means, the registers, the incrementers, the switching means, and the input/output means in response to the contents of the instruction register.

2. The CMOS microprocessor of claim 1 further including a random access memory coupled to the internal data bus.

3. The CMOS microprocessor of claim 1 further including a first output buffer coupled to the first address bus, and a second output buffer coupled to the second address bus.

4. The CMOS microprocessor of claim 1 further including a bit code generator coupled to the data bus for setting or resetting selected bits of data carried by the data bus under control of the instruction decode and control means.

5. The CMOS microprocessor of claim 1 wherein the switching means comprise transmission gates.

6. The CMOS microprocessor of claim 2 wherein the index register, accumulator register, first program counter register, first address store register, and the instruction register are all eight bit registers; the first incrementer is an eight bit incrementer; the second incrementer is a five bit incrementer; and the second address store register, the second program counter register, and the temporary store register are all five bit registers.

7. The CMOS microprocessor of claim 1 further having third switching means for selectively coupling the internal data bus to the transfer bus, and having fourth switching means for selectively coupling the data bus to the transfer bus.

8. The CMOS microprocessor of claim 8 wherein the switching means comprise transmission gates.

9. The CMOS microprocessor of claim 1 wherein the index register, the accumulator register, the stack pointer register, the first and second program counter registers, the first and second address store registers, and the temporary storage register comprise dual port storage cells.

* * * * *